United States Patent
Gillner et al.

(10) Patent No.: US 6,396,026 B2
(45) Date of Patent: May 28, 2002

(54) LAMINATED PANE

(75) Inventors: Manfred Gillner, Aachen; Eberhard Heermann, Hagen, both of (DE)

(73) Assignee: Saint-Gobain Glass France, Courbevoie (FR)

(*) Notice: Subject to any disclaimer, the term of this patent is extended or adjusted under 35 U.S.C. 154(b) by 0 days.

(21) Appl. No.: 09/833,626

(22) Filed: Apr. 13, 2001

(30) Foreign Application Priority Data

Apr. 13, 2000 (DE) .......................................... 100 18 276

(51) Int. Cl.[7] .................................................. B60L 1/02
(52) U.S. Cl. ........................ 219/203; 219/202; 219/219; 219/544; 52/171.2
(58) Field of Search ................................. 219/200, 201, 219/203, 219, 522, 544, 546–549; 52/171.2

(56) References Cited

U.S. PATENT DOCUMENTS

| 3,601,583 A | * | 8/1971 | Fujiwara | 219/522 |
|---|---|---|---|---|
| 3,629,040 A | * | 12/1971 | Hinton | 156/275 |
| 4,128,448 A | * | 12/1978 | Bitterice et al. | 156/166 |
| 5,132,161 A | * | 7/1992 | Shibata et al. | 428/192 |
| 5,824,993 A | * | 10/1998 | Chrysochoos et al. | 219/203 |
| 6,011,244 A | * | 1/2000 | Castle et al. | 219/522 |

* cited by examiner

*Primary Examiner*—Teresa Walberg
*Assistant Examiner*—Shawntina Fuqua
(74) *Attorney, Agent, or Firm*—Oblon, Spivak, McClelland, Maier & Neustadt, P.C.

(57) ABSTRACT

The invention relates to a laminated pane (1), in particular heating or aerial pane, having electrically conductive wires (2) which are embedded in a thermoplastic adhesion layer (3) and are in electrical contact in particular with at least one connection element, and is distinguished by the fact that the wires (2) comprise at least two conductive material layers, one of which consists of a metal which can withstand high mechanical loads and the other of which consists of a metal of higher electrical conductivity and good solderability. In a particularly advantageous embodiment of the laminated pane (1), there are electrically conductive wires (2) which have a core which is made from a metal which can withstand mechanical loads and is sheathed by a metal of higher conductivity and good solderability.

15 Claims, 2 Drawing Sheets

Figure 3:
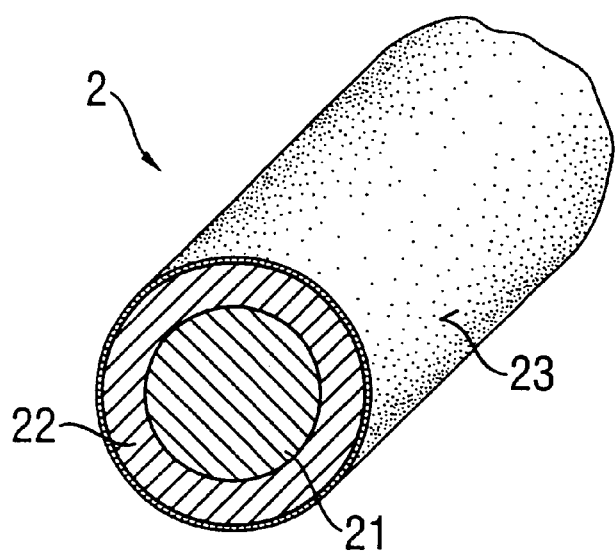

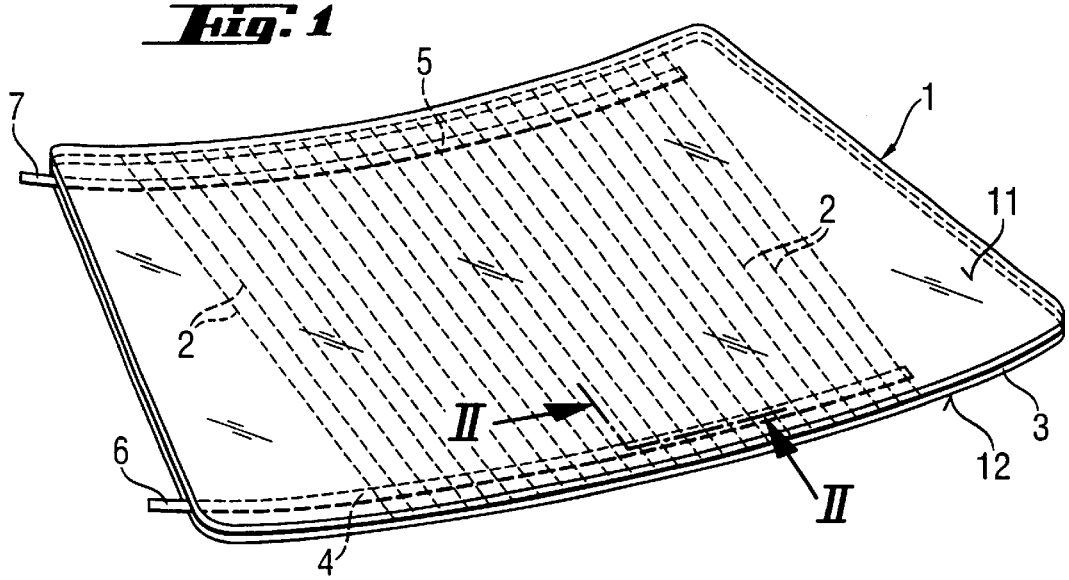
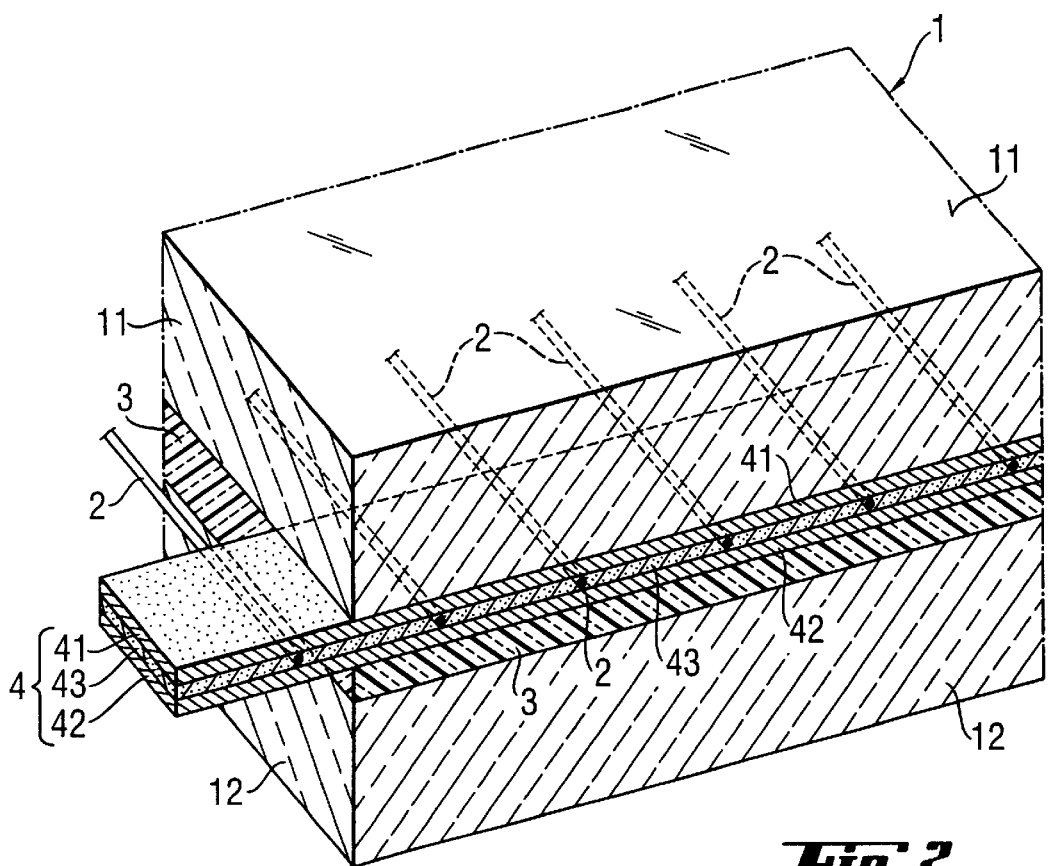

LAMINATED PANE

The invention relates to a laminated pane, in particular a heating or aerial pane, having the features of the preamble of Patent claim 1. In this context, the term laminated panes is intended to mean multilayer transparent panes comprising at least one rigid glass or plastic pane and a thermoplastic adhesion layer adhering thereto.

These features are known, for example, from EP 0 490 723 A1 or DE 195 41 009 A1.

A laminated pane of this type with a large-area coil of silver or copper wires is known from DE-U1-88 00 823. If necessary, the copper wires are to be tin-coated or silver-coated. The end-side tin-coating of bare wires is a conventional preparatory measure if the wire ends are to be electrically and mechanically connected to other components by soft soldering.

In the case of laminated panes which are designed as heating panes, thin tungsten wires are generally used as heating wires, and these are laid on the thermoplastic adhesion layer in straight or wavy form. To ensure good contact between the connection elements or busbars and the heating wires, the busbars used are in each case two copper foil strips which are tin-coated on at least one side. The two metal foil strips which enclose the ends of the heating wires between them and are tin-coated on this side are heated in a suitable way, for example with the aid of a soldering iron, so that the two tin layers fuse together and the tungsten wires are embedded between the two copper foil strips. The introduction of heat at this point should remain as low as possible, so that the thermoplastic film is not unintentionally damaged.

However, it is known that tungsten wires do not form a soldered connection, or form only an inadequate soldered connection, with tin solder alloys. Therefore, in the known laminated panes, the possibility exists that the heating wires will not be in sufficient electrical contact with the metal foil strips after the soldering of the two metal foil strips.

DE-U 94 11 516 has disclosed a heatable laminated glass pane in which changes to the heating wires caused by moisture diffusing in are ruled out or are at least considerably reduced as a result of a layer of an electrically conductive adhesive being arranged between the two metal foil strips. Therefore, in this laminated pane, an electrically conductive adhesion layer replaces the tin solder layer and simultaneously adheres to the wires over the entire cylindrical surface of the wires in the region between the two metal foil strips and produces the electrically conductive connection between the metal foil strips and the wires.

DE-U 298 03 544 has disclosed an electrically heatable laminated glass pane, in which each of the parallel-connected heating wires forms a meandering loop with an uneven number of loop sections extending over the width of the pane. Because of the meandering arrangement of the heating wires and their large effective length, it is possible to use wire materials of lower resistivity than tungsten, for example copper or a copper alloy. Instead of a busbar, the ends of the heating wires which are of the same polarity are brought together at in each case one location and are connected to in each case one current connection element. The material of the heating wires ensures a good soldered connection to the current connection elements. A drawback of this type of laminated pane provided with electrically conductive wires is the need to use a device which resembles a plotter to lay the wires, as this device operates relatively slowly. The wire-laying device which is known from DE 195 41 427 A1, in which a plurality of intermediate thermoplastic films arranged on a drum are provided with the wires simultaneously and at high speed cannot be used, on account of the wires being laid in meandering loops and on account of the inadequate mechanical strength of the copper wire.

DE 42 35 063 A1 and DE 43 32 320 C1 have disclosed laminated glass pane in which metal wires embedded in the thermoplastic adhesion layer are used as an aerial for radio reception. Ribbon cables made from copper in this case preferably serve as connection elements for the aerial wires, which may also consist of tungsten. When connecting the antenna wires to the connection elements, similar difficulties as those encountered with heating panes arise.

DE 44 16 165 A1 has disclosed a radar-absorbing arrangement for window glazing or facade facings which is of double layer structure with a layer which partially reflects electromagnetic radiation and is arranged in the region of the outer layer and a further reflective layer which is arranged in the region of the inner layer, at a spacing of approximately one quarter of the operating wavelength. This arrangement comprises wire-like electric conductor sections which lie parallel to one another and are arranged in a regular geometric pattern. Tungsten wires have proven to be a particularly suitable material for the conductor sections, since their low thickness means that they are scarcely visible in window glazing. For window glazing, it is considered particularly advantageous for the conductor sections to be applied to a plastic film, for example of polyvinyl butyral. Since the conductor sections are not connected to connection elements, in this case the problem of electrical contact-making does not arise.

It is known from DE-A1-197 03 390 to provide wires of iron or unalloyed steel, which are intended for processing into fencing strips and the like, with a conductive and corrosion-resistant coating with a conductive metal, such as copper, nickel, zinc, chromium, tin or tin/lead. Although these wires must indubitably have a high tensile strength, the problem of solderable contact-making and of (visually inconspicuous) installation in a laminated pane does not arise.

The invention is based on the object of avoiding the abovementioned drawbacks and providing composite panes of the type described in the introduction with a wire material which is improved in terms of the surface conductivity and, if appropriate, solderability.

According to the invention, this object is achieved by the feature of patent claim 1. The features of the subclaims specify advantageous refinements of this subject matter.

In the context of the invention, the term busbar is intended to mean not only a ribbon-like electrical conductor connected to a plurality of wires, but also any electrically conductive connection element of any geometric form which is connection to at least one wire which has been laid on the thermoplastic adhesion layer.

Therefore, wires which do not consist of a homogenous material, but rather are of multilayer structure, are used for the laminated pane according to the invention. The different properties of the individual materials can be utilized in a controlled way in this manner. One demand imposed on a wire of this type is that it has sufficient mechanical strength, in particular tensile strength, so that the wires, which are generally only between 10 $\mu$m and 70 $\mu$m thick, can be processed automatically without difficulty and can be laid on the thermoplastic adhesion layer in straight or wavy form without loops being formed. There is no question of using a greater diameter for the purpose in question, since it would then be impossible to ensure an unimpeded view through the pane.

A second requirement is to establish the electrical resistance which is required for the particular application with the predetermined diameter. For example, to produce a heatable laminated pane, the resistance of the wires, which extend between 2 busbars which lie opposite one another at a distance of approximately 0.5 m to 2 m, must be appropriate for the required heating capacity. And finally, it must be possible to ensure a good electrical and mechanical connection of the wires, in particular by soft soldering, to the busbars.

The multilayer wire which is embedded in the adhesion layer on one surface of a rigid pane consists of a metal which can withstand high mechanical loads, preferably of stainless steel, which is joined to a metal which has a higher conductivity and can be soldered well, preferably copper.

The cross section of a wire of this type therefore has at least two areas of different material properties. A combination of electrically conductive metals of this type represents a parallel circuit of electrical resistances. The individual resistances are dependent on the geometric dimensions and the resistivities. As a result of the ratio between the cross-sectional areas of the metal which can withstand mechanical loads and the metal of higher conductivity being changed, it is possible to adapt the electrical resistance of the wire per unit length to the particular application. In addition to chromium-nickel steel, which has already been mentioned above, by way of example other steel and stainless steel alloys, alloys of chromium/nickel, copper/nickel, nickel/cobalt, titanium and tungsten are also suitable materials for that part of the wire which can withstand mechanical stresses. As well as copper, it is also possible to use other metals which have a good conductivity and can be soldered, such as for example silver, gold, aluminum or alloys of these metals, provided only that it is ensured that there is a good and permanent bond between the two materials of the wire.

The wire may, for example, be a layered strip of two or more layers of interconnected, electrically conductive material. However, it has proved particularly advantageous for the wire to be constructed from a core of the material which can withstand high mechanical stresses and a sheath of the metal of higher conductivity which surrounds this core. This form of wire may be round, elliptical or polygonal in cross section.

The copper coating takes place at a wire diameter of 0.2 to 0.4 mm. These wires are then fine-drawn to the final dimensions. A resistance of at most 150 $\Omega$/m with the smallest possible diameter of the coated wire is desired.

In principle, stainless steel wire can be produced particularly well by fine drawing, since the material has a good ductile behaviour. Tests have shown that an authentic stainless steel designated by materials number 1.4306 (International Standard Designation AISI 403 L) is particularly suitable. The fine diameters produced with this material were impossible to achieve with NiCr materials.

Furthermore, in particular copper adheres particularly well to the stainless steel base material after application by electroplating. With certain combinations of materials, hose effects, in which the outer layer of the highly conductive material tears open and then encloses the metal wire core in sections in the manner of a hose without adhering thereto, may occur when fine-drawing wires (i.e. when reducing the wire diameter to the extremely small dimensions desired here). By contrast, given the good adhesion between stainless steel and copper plating, these problems also do not occur during the fine drawing.

The laminated pane according to the invention with multilayer, electrically conductive wires can be designed not only as an electrically heatable pane but also, for example, as an aerial pane. In this case, it is particularly advantageous that the surface conductivity of a wire which consists of a metallic core and a sheath of a more highly conductive metal is greater than that of a homogenous wire. This counteracts the skin effect, in which high-frequency currents flow primarily at the surface of conductors, so that it is possible to produce pane aerials of particularly high quality. If designed suitably, the laminated pane according to the invention can also be used for further applications, for example as a window protecting against electromagnetic radiation.

The use of a metal of good solderability opens up the possibility of soft-soldering the wires to the busbars. Unlike in the prior art, in which generally tungsten wires are simply embedded between two tin-plated copper foils, with the laminated pane according to the invention it is possible to achieve true soldering if suitable busbars are selected. It is also not necessary for the busbars to comprise two metal foils between which the end sections of the wire are embedded; rather, the busbar may comprise a single-layer strip or foil.

In a further advantageous configuration of the laminated pane, the wires are provided with a matt paint. This makes it possible to effectively reduce or even altogether prevent disruptive reflections which emanate from a possibly shiny metallic surface of the wire. During the soldering operation, the paint layer will break open without requiring special measures and does not impede correct soldering of the wires and busbars.

In this case, once again, copper has the advantage over other highly conductive covering layer materials (such as for example silver) that it is itself relatively dark and unobtrusive. Only a very thin layer of paint has to be applied to copper in order for it to be possible for the wire to be fitted in a visually inconspicuous manner in the laminated pane. The thinner the layer of paint can be kept, the thinner the overall finished, painted wire, since, of course, the layer of paint increases the overall diameter of the wire slightly.

Further details and advantages of the subject matter of the invention will emerge, without any restriction being intended, from the drawing of an exemplary embodiment which is based on an electrically heatable laminated pane and from the associated detailed description given below.

IN THE DRAWINGS

Figure 4:
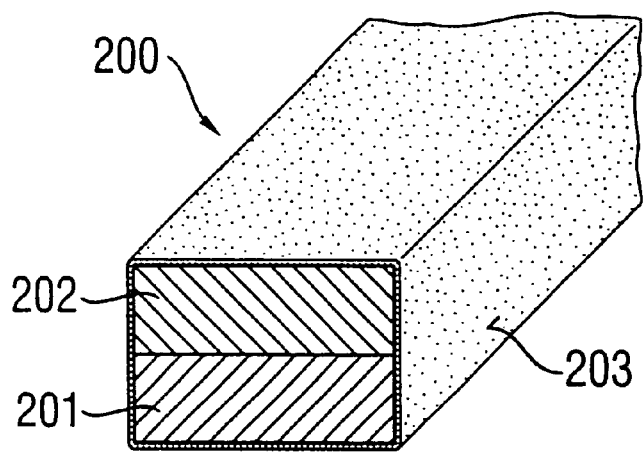

FIG. 1 shows a simplified, perspective view of a laminated pane according to the invention, FIG. 2 shows a simplified, enlarged detailed illustration as a section on line II—II, FIG. 3 shows a simplified, enlarged sectional view of an embodiment of a heating wire, and FIG. 4 shows a simplified, enlarged sectional view of a further embodiment of a heating wire.

In accordance with the FIG. 1, the laminated pane 1, which in the case illustrated is a wind shield for motor vehicles, has heating wires 2 which are arranged parallel to one another and extend between the upper and lower edges of the pane. The heating wires 2 have been laid using a known method, prior to the production of the pane lamination, on the thermoplastic adhesion layer 3 of polyvinyl butyral (PVB), which is arranged between the two individual panes 11 and 12 made from silicate glass. The individual heating wires 2 are spaced apart at intervals of, for example, 2 mm to 15 mm.

The heating wires 2 are connected in parallel to two busbars 4 and 5 which are arranged at a short distance from the upper and lower edges of the laminated pane 1. The end sections 6 and 7 of the busbars 4 and 5, which lead out of the laminated pane 1 at the side, are used to connect the busbars to the on-board power supply.

The structure of the busbars 4 and 5 including the way in which they are connected to the heating wires 2 can be seen from FIG. 2. The busbar 4 comprises a copper foil strip 41, which lies above the heating wires 2, and a copper foil strip 42, which lies below the heating wires 2, between which strips a layer of soft solder 43 (tin solder) is arranged. The soft solder 43 is already present on one or both copper foil strip (s) as a previously applied tin coating before the soldering operation. Therefore, there is no need to supply solder during the soft soldering. The thickness of the layer of soft solder 43 approximately corresponds to the diameter of the heating wires 2, but may also be less. In this case, the heating wires deform the copper foil strips during the soldering operation, so that they form small bulges at the locations of the wires. These are compensated for when joining the material of the adhesive film which melts on.

Generally, the busbars are covered by a decorative frame of ceramic stoving paint from one or both viewing directions. This decorative frame may be applied to one or both panes and may be arranged both within the laminate and on an outer principle surface of the panes. These decorative frames are not shown here for the sake of simplicity.

FIG. 3 shows an enlarged cross section through a heating wire 2 with an overall diameter of 30 μm. The heating wire 2 comprises a core 21 which has a diameter 20 μm thick and is made from chromium-nickel steel, this core being surrounded by a copper sheath 22, the diameter of which is 5 μm. The lateral surface of the heating wire 2 is provided with a matt black layer of paint 23, in order to prevent metallic reflection in the laminated pane. This does not impede the soldering of the heating wires.

FIG. 4 shows a different, strip-like embodiment of a heating wire 200, in which a strip 201 of chromium-nickel steel, which is 30 μm wide and 10 μm high, forms a region which can withstand high mechanical loads and is covered by and joined to a more highly conductive, rectangular strip 202 of copper of the same dimensions. In this embodiment too, a reflection -reducing layer of paint 203 covers the entire surface of the heating wire 200. If a strip-like, layered heating wire of this type is used in combination with only one tin-plated copper foil strip, when soldering it is, of course, necessary to ensure that the readily solderable copper strip 202 is brought into contact with the tin solder of the copper foil strip.

The laminated pane illustrated in the drawings is produced in the following way: the two individual glass panes 11 and 12 are cut and bent into the desired shape in the usual way. Independently of this, the thermoplastic adhesion layer 3 together with the busbars 4 and 5 and the heating wires 2 are prepared. For this purpose, first of all the lower copper foil strips 42 are laid on a 0.76 mm film of polyvinyl butyral, at the locations at which the busbars are intended to be arranged. Copper foil strips which have previously been tin-coated on the freely accessible side are used for this purpose. If necessary, the copper foil strips which have been laid may be pressed on by a suitable tool or fixed in some other way, for example with an adhesive.

Then, the heating wires 2 are laid on the polyvinyl butyral film and are fixed on the film surface by the use of heat and pressure. The heating wires 2 may be laid, for example, using a device such as that described in DE 195 41 427 A1. The heating wires 2 are guided over the previously tin-coated copper foil strips 42. After all the heating wires have been laid on the PVB film, the upper copper foil strips 43 are laid on the copper foil strips 42 which are adhering to the PVB film. In the process, the heating wires 2 are enclosed between the two copper foil strips 42 and 43. The soldering can now be carried out by simple heating of the upper copper foil strip 43, for example using a soldering iron. After any end sections of the heating wires which project outside the heating area enclosed between the busbars have been cut off, the thermoplastic adhesion layer is ready for further processing.

The adhesion layer which has been prepared in this way is laid down together with the two individual glass panes 11 and 12 and the air is removed from the laminated arrangement in a known way by a vacuum treatment. Then, the laminated arrangement is definitively joined in an autoclave at a temperature of approximately 140° C. and a pressure of approximately 12 bar.

As an alternative to the exemplary embodiment shown, the busbar, on account of the good solderability of the multilayer wires used, may also comprise only one foil layer of a strand of wire. In this case, in the exemplary embodiment the upper copper foil strip could be dispensed with and only the lower copper foil strip, which has already been fixed to the adhesion layer, after laying of the wires could be soldered to the ends of these wires, with production otherwise taking place in the same way.

The laminated pane according to the invention is in no way restricted to a laminated glass pane of the type described in the exemplary embodiment. Rather, designs with only one glass pane and one plastic pane or with two plastic panes are also conceivable.

What is claimed is:

1. A laminated pane comprising:
   first and second panes;
   a thermoplastic adhesion layer between said first and second panes;
   electrically conductive wires embedded in said thermoplastic adhesion layer, wherein each of said electrically conductive wires is in electrical contract with at least one connection element, and wherein each of said electrically conductive wires include at least two conductive material layers, a first conductive material layer of said at least two conductive material layers being made of a metal which can withstand high mechanical loads and a second conductive material layer of said at least two conductive material layers being made of a metal of good solderability and higher electrical conductivity than said metal of said first conductive material layer.

2. The laminated pane according to claim 1, wherein said at least one connection element is a first busbar, said first busbar extending in a direction transverse to a direction in which said electrically conductive wires extend, and said first busbar extending along a first edge of said laminated pane.

3. The laminated pane according to claim 2, wherein each of said electrically conductive wires have a core made from a first metal which is the same as said metal of said first conductive material layer.

4. The laminated pane according to claim 3, wherein said core has a sheath therearound such that said sheath is made of a second metal which is the same as said metal of said second conductive material layer.

5. The laminated pane according to claim 4, wherein said first conductive material layer is made of any one of a group consisting of steel, stainless steel, chromium/nickel steel, chromium/nickel alloys, copper/nickel alloys, nickel/cobalt alloys, titanium, and tungsten.

6. The laminated pane according to claim 3, wherein said second conductive material layer is made of any one of a group consisting of copper and alloys thereof, silver and alloys thereof, gold and alloys thereof, and aluminum and alloys thereof.

7. The laminated pane according to claim 6, wherein said first conductive material layer and said core of each of said electrically conductive wires is made of authentic stainless steel, said second conductive material layer and said sheath surrounding said core of each of said electrically conductive wires is made from copper, said core of each of said electrically conductive wires has a diameter of between approximately 5 $\mu$m and approximately 50 $\mu$m, and said sheath of said core of each of said electrically conductive wires is surrounded by an approximately 1 $\mu$m to approximately 25 $\mu$m thick.

8. The laminated pane according to claim 7, wherein each of said electrically conductive wires are coated with a reflection-reducing paint.

9. The laminated pane according to claim 8, wherein each of said electrically conductive wires are soldered to said first busbar.

10. The laminated pane according to claim 9, wherein said first busbar includes first and second metal foil strips which enclose ends of each of said electrically conductive wires between said first and second metal foil strips.

11. The laminated pane according to claim 10, wherein said first and second metal foil strips of said first busbar are tin-coated copper foil strips.

12. The laminated pane according to claim 11, wherein said at least on connection element includes a second busbar, said second busbar extending in a direction transverse to a direction in which said electrically conductive wires extend, said second busbar extending along a second edge of said laminated pane which is opposite said first edge.

13. The laminated pane according to claim 12, wherein each of said electrically conductive wires are soldered to said second busbar.

14. The laminated pane according to claim 13, wherein said second busbar includes first and second metal foil strips which enclose ends of each of said electrically conductive wires between said first and second metal foil strips.

15. The laminated pane according to claim 14, wherein said first and second metal foil strips of said second busbar are tin-coated copper foil strips.

* * * * *